United States Patent [19]
Batterman

[11] Patent Number: 6,116,744
[45] Date of Patent: Sep. 12, 2000

[54] METHOD AND APPARATUS FOR ILLUMINATING RETROREFLECTIVE AND OTHER OBJECTS

[75] Inventor: Eric P Batterman, Flemington, N.J.

[73] Assignee: Omniplanar, Inc., Princeton, N.J.

[21] Appl. No.: 08/824,105

[22] Filed: Mar. 25, 1997

Related U.S. Application Data

[60] Provisional application No. 60/015,273, Apr. 4, 1996.

[51] Int. Cl.[7] ...................................................... F21L 15/08
[52] U.S. Cl. .......................... 362/103; 362/800; 362/234; 446/27
[58] Field of Search ..................................... 362/103, 800, 362/105, 253, 234, 293, 296; 446/27; 351/44, 45; 2/15

[56] References Cited

U.S. PATENT DOCUMENTS

| | | | |
|---|---|---|---|
| 3,119,195 | 1/1964 | Braunhut | 446/27 |
| 4,254,451 | 3/1981 | Cochran, Jr. | 362/103 |
| 5,671,035 | 9/1997 | Barnes | 351/45 |

*Primary Examiner*—Thomas M. Sember
*Attorney, Agent, or Firm*—Allan Jacobson

[57] ABSTRACT

An apparatus for viewing a retroreflective object positions a light source proximate a human eye, by affixing it to, for example, a pair of goggles. The light source emits light outward in substantially the direction of view of the human eye. Upon striking a retroreflective object, the light is strongly reflected back to the human eye, producing a unique visual effect. The apparatus may be used in toy form to simulate a night vision scope. Various combinations of colored light sources, optical color filters interposed between the human eye and the retroreflector, and colored retroreflectors may be used to enhance the visual effect and increase the play variations available. The light source may switch on and/or off automatically, or may flash. Electronic light sensing means may provide a visible and/or audible alert when a retroreflective object is in view.

8 Claims, 2 Drawing Sheets

METHOD AND APPARATUS FOR ILLUMINATING RETROREFLECTIVE AND OTHER OBJECTS

CROSS REFERENCES TO RELATED APPLICATIONS

This application derives from provisional application 60/015,273 filed on Apr. 4,1996.

FIELD OF THE INVENTION

The present invention relates generally to a wearable device that brightly illuminates retroreflective and other objects. A further object of the invention is to provide a very low cost toy simulation of night vision scopes.

SUMMARY OF THE INVENTION

An apparatus in accordance with the present invention is embodied in a pair of goggles for viewing a retroreflective object. The goggles include a light source positioned proximate to the human eye, by affixing to the goggles, for example, a light emitting diode (LED). The light source emits light outward in substantially the direction of view of the human eye. Upon striking a retroreflective object, the light is strongly reflected back to the human eye, producing a unique visual effect. The apparatus may be used in toy form to simulate a night vision scope. Various combinations of colored light sources, optical color filters interposed between the human eye and the retroreflector, and colored retroreflectors may be used to enhance the visual effect and increase the play variations available. The light source may switch on and/or off automatically, or may flash. Electronic light sensing means may provide a visible and/or audible alert when a retroreflective object is in view.

DETAILED DESCRIPTION OF THE INVENTION

Figure 1:
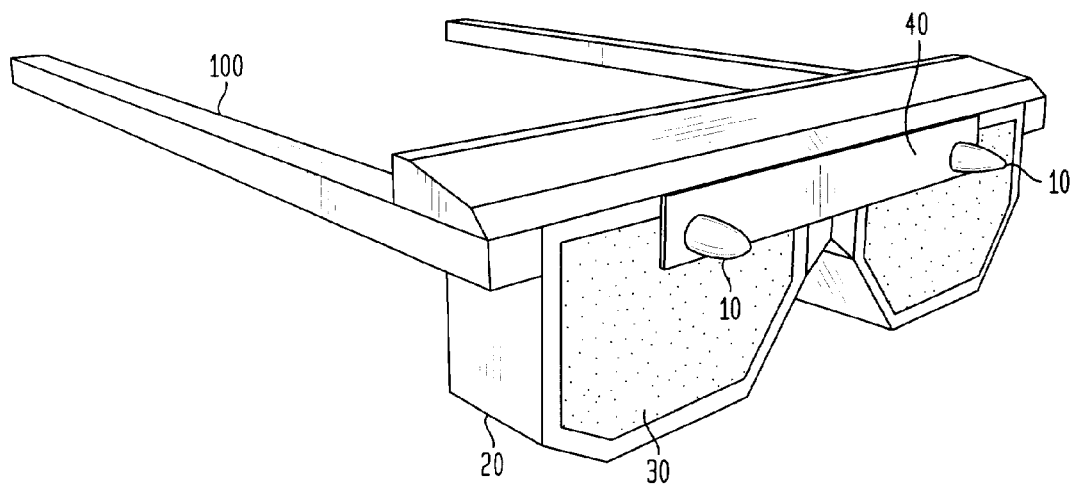
FIG. 1 shows a preferred embodiment of direct illuminating head set.

The present invention is based upon the recognition that retroreflective objects in combination with a source of illumination placed near the human eye would be a unique type of amusement toy that simulates "night vision scopes" as used by military and law enforcement. FIG. 1 shows a preferred embodiment of the viewer of the present invention where light sources 10 are safely placed near the eye by mounting them to goggles 100. Additionally, each side 20 of the goggles 100 have optical filters 30.

The light sources 10 are preferably light emitting diodes (LEDs). The lights sources are placed as near as possible to the optical axis of each eye, without obscuring vision. It is preferable to place the light sources 10 centered above each eye at eye brow level. The position of the light sources may be adjustable to maximize performance of the invention, and to allow for a wide range of sizes of users. A baffle, or light blocking device 40 is used to shield the eye from any light coming direct from the LED.

The illuminated objects are marked using retroreflective material such as type D65 material from Reflexite North America. Retroreflective material has the property that it sends light from a source back in the direction of the source. Thus, if a light source 10 is mounted very near the optical axis of the eye, the light from the retroreflective material will be directed back towards the source, and hence, to the eye. This embodiment is useful since the retroreflective material appears to shine very brightly when illuminated by a source near the eye. It also makes very efficient use of light energy and allows the use of relatively low power illumination. There are a many different retroreflective materials that can be used including miniature corner cube sheets (such as Reflexite D65), paints, glass bead powder, and chalk. Examples of these materials include 3M Scotchlite(TM) reflective sheeting (7610, 3870, 2000X, 3000X), 3M Scotchlite(TM) reflective liquid, and 3M Codit(TM) reflective chalk. Additionally, retroreflectors can be fabricated in molded plastic similar to ordinary bicycle reflectors. Phosphorescent materials can also be used.

The optical filters 30 are matched to only pass the wavelength of the light sources 10 and are used to emphasize the reflected light, by attenuating any ambient light that may be present. Additionally, the use of the filters 30 presents a picture simulating night vision scopes which typically have monochrome (i.e. single color) displays.

The color of the filters and LEDs can be chosen to increase the ways in which the present invention is used. Retroreflectors can reflect all colors of light, some, or limited colors depending on how they are made. For example, a blue retroreflector will reflect blue light but not red light. A white or silver retroreflector will reflect all colors of light. Choosing the colors of the retroreflector, light sources 10 and filters 30 can make certain objects visible to some users, and certain objects visible to all users.

A wide variety of uses and games may utilize the present invention. In the category of war games, the retroreflective material can be placed on clothing, vests, helmets, etc. worn by the participants. If one user (or team) has one color LEDs, filters, and retroreflectors such as red, and the other user has blue, then friends would be easy to identify and foes would not. In another version, if a light source with a wider bandwidth was used (such as available yellow LEDs), "friends" may have red retroreflectors and foes may have green retroreflectors. In this application, "friend" and "foe" can be identified by all. Additionally, the use of broad band light (or multiple color light) and no optical filter will make objects appear whatever color is chosen for the retroreflectors, allowing full color applications.

The retroreflective material may also be placed on toy vehicles such as tanks and airplanes, and toy figures or figurines such as soldiers and monsters. The retroreflective material may be in the shape and/or color of representations of astronomical objects such as stars, planets, and the like which may be placed on the ceiling and walls to simulate the night sky.

Figure 2:
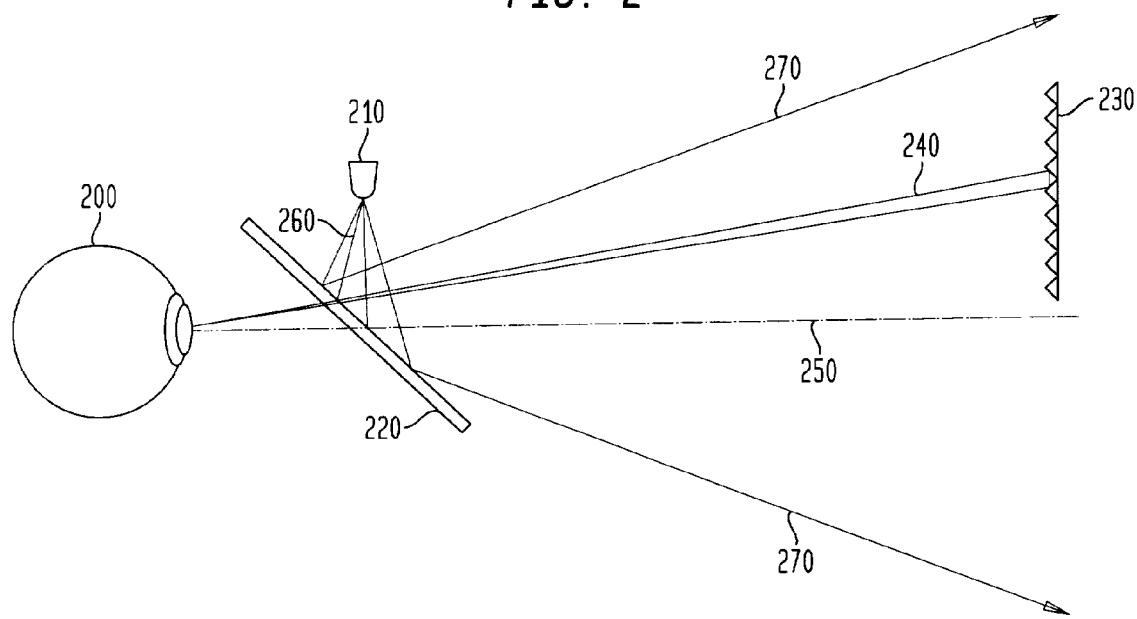
FIG. 2 is a diagram of the light reflections using a retroreflector and half silvered mirrors

FIG. 2. shows another embodiment of the present invention where light source 210 points in a downward direction. The light rays 260 and 270 from LEDs 210 are reflected off a half-silvered mirror 220. The rays that hit retroreflector 230, such as ray 240, and are reflected back to mirror 220, and continue through the mirror and to the eye of the user 200. This arrangement effectively places the apparent source of the light along the optical axis of the eye 250.

Figure 3:
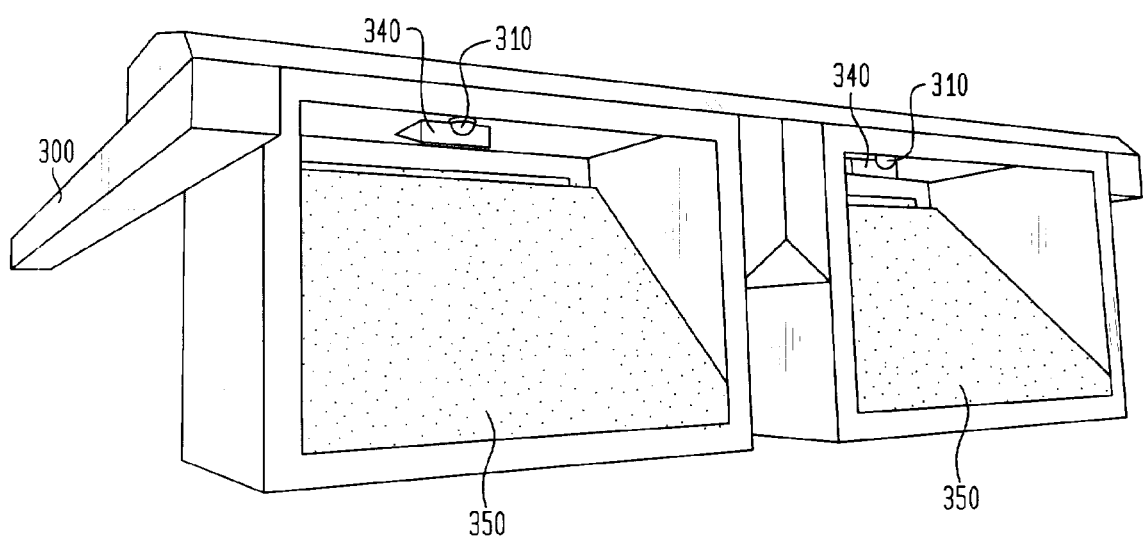
FIG. 3 shows a preferred embodiment of a illuminating head set incorporating mirrors

FIG. 3 shows goggles 300 incorporating the light arrangement of FIG. 2. The light sources 310 are mounted above the eye pointing down. A baffle, or light blocking device 340 is used to shield the eye from any light coming direct from the LED. Half-silvered mirror 350 is used to send the LED light out to the object and to let the reflected light pass back to the eye. Optical filters may also be incorporated.

In a preferred embodiment, the light sources may be powered by batteries, and may have various features to enhance performance.

Variable intensity can be used to set the light intensity to 4a level that only provides return from the retroreflective objects. Since very low power is required to brightly illuminate retroreflectors, lowering power appropriately stops illumination of non-retroreflective objects. Additionally, flashing of the lights can be used to distinguish retroreflective objects from non-retroreflective objects. Various means to conserve battery life may be incorporated in a preferred embodiment including an instantaneous on switch, automatic shut off, activation of the lights when the user is wearing the device by sensing pressure, motion, etc.

Another feature that can be incorporated is the ability to electronically sense when a retroreflector is being illuminated by using a light sensor and processing electronics. The sensor is preferably mounted near the source of illumination. When return light is detected by the sensor and electronics, the user may be alerted by means including a tone, warning message, or by changing how the lights are controlled (i.e. flashing, held on, etc.). The electronics for sensing the retroreflected light can be simplified by pulsing the lights with a pattern that is easily detectable (using specific frequencies and duty cycles).

The basic concepts of using retroreflective objects in combination with a source of illumination placed near the human eye can be embodied in a wide variety of wearable and/or hand-held (i.e. held up to the eyes by the users hand) form factors including the goggles described above, light weight glasses, and toy night-vision scopes. Hand-held form factors include telescopes, binoculars, and opera glasses.

What is claimed is:

1. An apparatus for viewing an at least partially retroreflective object comprising:

a viewer having a viewing axis substantially collinear with a human eye's optical axis;

a light source affixed to the viewer for producing light having a propagating axis substantially collinear with the viewing axis, so that when the light is directed at the retroreflective object, a portion of the light returns by retroreflection from the at least partially retroreflective object to the human eye, wherein the light has a color; and an optical filter interposed between the human eye and the at least partially retroreflective object and transmitting only the color of the light.

2. The apparatus of claim 1, wherein the viewer is a toy simulating the appearance of an item selected from a set of items comprising glasses, goggles, a night-vision scope, a telescope, binoculars, and opera glasses.

3. The apparatus of claim 1, wherein the at least partially retroreflective object is selected from a set of objects comprising toy vehicles, toy figures, toy figurines, representations of astronomical objects, apparel, and protective gear.

4. The apparatus of claim 1, wherein the light source is a light emitting diode.

5. The apparatus of claim 1, further comprising means for automatically switching on the light source.

6. The apparatus of claim 1, further comprising means for automatically switching off the light source.

7. An apparatus for viewing an at least partially retroreflective object comprising:

a viewer having a viewing axis substantially collinear with a human eye's optical axis, and a light source affixed to the viewer for producing light having a propagating axis substantially collinear with the viewing axis, so that when the light is directed at the retroreflective object, a portion of the light returns by retroreflection from the at least partially retroreflective object to the human eye, wherein the viewer further comprises a partially reflecting mirror operating to redirect a portion of the light produced by the light source onto the propagating axis.

8. An apparatus for viewing an at least partially retroreflective object comprising:

a viewer having a viewing axis substantially collinear with a human eye's optical axis, and a light source affixed to the viewer for producing light having a propagating axis substantially collinear with the viewing axis, so that when the light is directed at the retroreflective object, a portion of the light returns by retroreflection from the at least partially retroreflective object to the human eye;

a switch for automatically switching the light source on and off at a predetermined frequency; and an electronic light sensor affixed to the viewer, wherein an alert is produced when the electronic light sensor receives retroreflected light at the predetermined frequency.

* * * * *